(12) United States Patent
Berndt (10) Patent No.: US 7,396,444 B2
(45) Date of Patent: Jul. 8, 2008

(54) DEVICE TO OPERATE A LABORATORY MICROCHIP

(75) Inventor: Manfred Berndt, Karlsbad (DE)

(73) Assignee: Agilent Technologies Inc., Santa Clara, CA (US)

( * ) Notice: Subject to any disclaimer, the term of this patent is extended or adjusted under 35 U.S.C. 154(b) by 907 days.

(21) Appl. No.: 10/834,280

(22) Filed: Apr. 29, 2004

(65) Prior Publication Data

US 2004/0202581 A1 Oct. 14, 2004

Related U.S. Application Data

(63) Continuation of application No. 09/598,890, filed on Jun. 22, 2000, now Pat. No. 6,919,045.

(30) Foreign Application Priority Data

Jun. 22, 1999 (DE) ................................ 199 28 410

(51) Int. Cl.
*C02F 1/40* (2006.01)
*B01L 3/02* (2006.01)
*G01N 1/10* (2006.01)

(52) U.S. Cl. .................. 204/601; 422/100; 422/58; 422/102; 204/600; 204/604; 204/451; 204/453; 436/180; 436/174

(58) Field of Classification Search .................. 422/58, 422/100, 102; 436/174, 180; 204/600–601, 204/604, 451, 453
See application file for complete search history.

(56) References Cited

U.S. PATENT DOCUMENTS 4,840,730 A 6/1989 Saxena .................... 210/198.2

(Continued)

FOREIGN PATENT DOCUMENTS

DE 19928412 C2 3/2002

OTHER PUBLICATIONS

Black and white photographs of prototype.

(Continued)

*Primary Examiner*—Brian R. Gordon (57) ABSTRACT

In a device to operate and handle a laboratory microchip to chemically process or analyze substances, the microchip is on a chip holder (41) that is part of a first assembly (42). The first assembly (42) also has an optical device (43) for contactless detection of the results of the chemical processes carried out on the microchip. A supply device (56) required to operate the microchip is in a module releasably connected to a second assembly (44, 55). In particular, the second assembly (44, 55) has an intermediate carrier (57) that is releasably connected to the supply device (56). The intermediate carrier has continuous electrical paths (60) or connecting channels that can bridge electrodes (58) or supply channels of the supply device (56) and the assigned counterelectrodes (53) of the microchip. There are correspondingly connecting lines (61) to bridge the supply of materials. On the one hand, the bridging serves to prevent wear and soiling of the supply device (56) electrodes that arises upon contacting the microchip. In addition, the intermediate carrier also serves to spatially adapt the electrodes of the supply device (56) to the respective surface or spatial arrangement of the electrode surfaces of the microchip. It is thereby advantageously possible to adapt the entire measuring or operating device to special microchip layouts merely by exchanging the intermediate carrier (57).

40 Claims, 8 Drawing Sheets

U.S. PATENT DOCUMENTS

| | | | |
|---|---|---|---|
| 5,035,138 A | 7/1991 | Abdel-Rahman | 73/204.15 |
| 5,571,410 A | 11/1996 | Swedberg et al. | 210/198.2 |
| 5,863,801 A | 1/1999 | Southgate et al. | 436/63 |
| 5,955,028 A | 9/1999 | Chow | 422/63 |
| 5,989,402 A | 11/1999 | Chow et al. | 204/601 |
| 6,766,817 B2 | 7/2004 | da Silva | |

OTHER PUBLICATIONS

Shuchi Shoji et al., "Microflow devices and systems", J. Micromech. Microeng. 4 (1994) 157-171.

DEVICE TO OPERATE A LABORATORY MICROCHIP

This application is a continuation of U.S. Ser. No. 09/598,890 application No. filed Jun. 22, 2000, now U.S. Pat. No. 6,919,045 which claims priority to GERMAN Patent Application No. 199 28 410.5 filed Jun. 22, 1999.

In general, the present invention concerns microchip laboratory systems that carry out chemical and chemical-physical, physical, biochemical and/or biological processes, especially for analyzing or synthesizing substances on a substrate with a microfluid structure electrically, electronically, electromagnetically, mechanically or controlled in a similar manner. In particular, the invention concerns a device to operate such a laboratory microchip where a supply unit provides the potential necessary for moving the substance along the microfluid structure, and supply lines are provided to transmit the potential to the microchip.

The continuous development in this area is best illustrated by a comparison with corresponding developments in the field of microelectronics. In the field of chemical analysis as well, there is a substantial need (not least in the area of clinical diagnosis) to integrate existing stationary laboratory devices into portable systems and correspondingly miniaturize them. An overview of the most recent developments in this field of microchip technology is found in a collection of relevant professional publications published by Kluwer Academic Publishers (Holland, 1995) by A. van den Berg and P. Bergveld with the title, *Micro Total Analysis Systems*. The takeoff point for these developments was the established method of capillary electrophoresis; efforts had been made in the past to implement this method on a planar glass microstructure.

Figure 1:
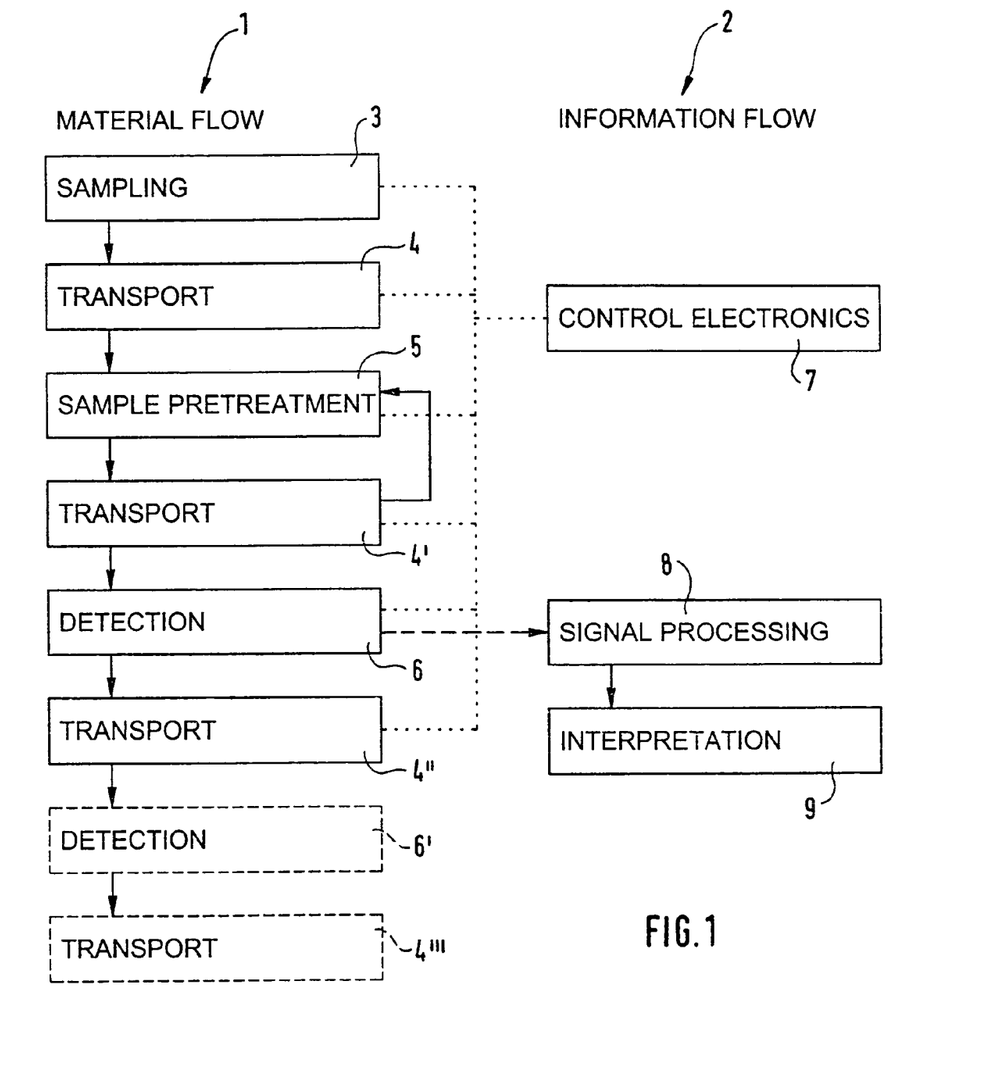
FIG. 1 A schematic block diagram of the functional components required for a laboratory microchip system.

The basic required components for such a microchip system are shown in FIG. 1. They are basically divided into systems that have a material flow 1, and systems that represent an information flow 2 that occurs during an experiment. In the area of the material flow 1, means are necessary to supply 3 and transport 4 substances on the chip, and means are required to treat e.g. pretreat 5 the investigated substances. Furthermore, sensors 6 are required to detect the results of an experiment. The arising flow of information is essentially for controlling the transport of substance on the chip using e.g. control electronics 7. In addition, a flow of information occurs while processing in the signals 8 of the detected measured results, and especially while evaluating them 9.

Figure 2:
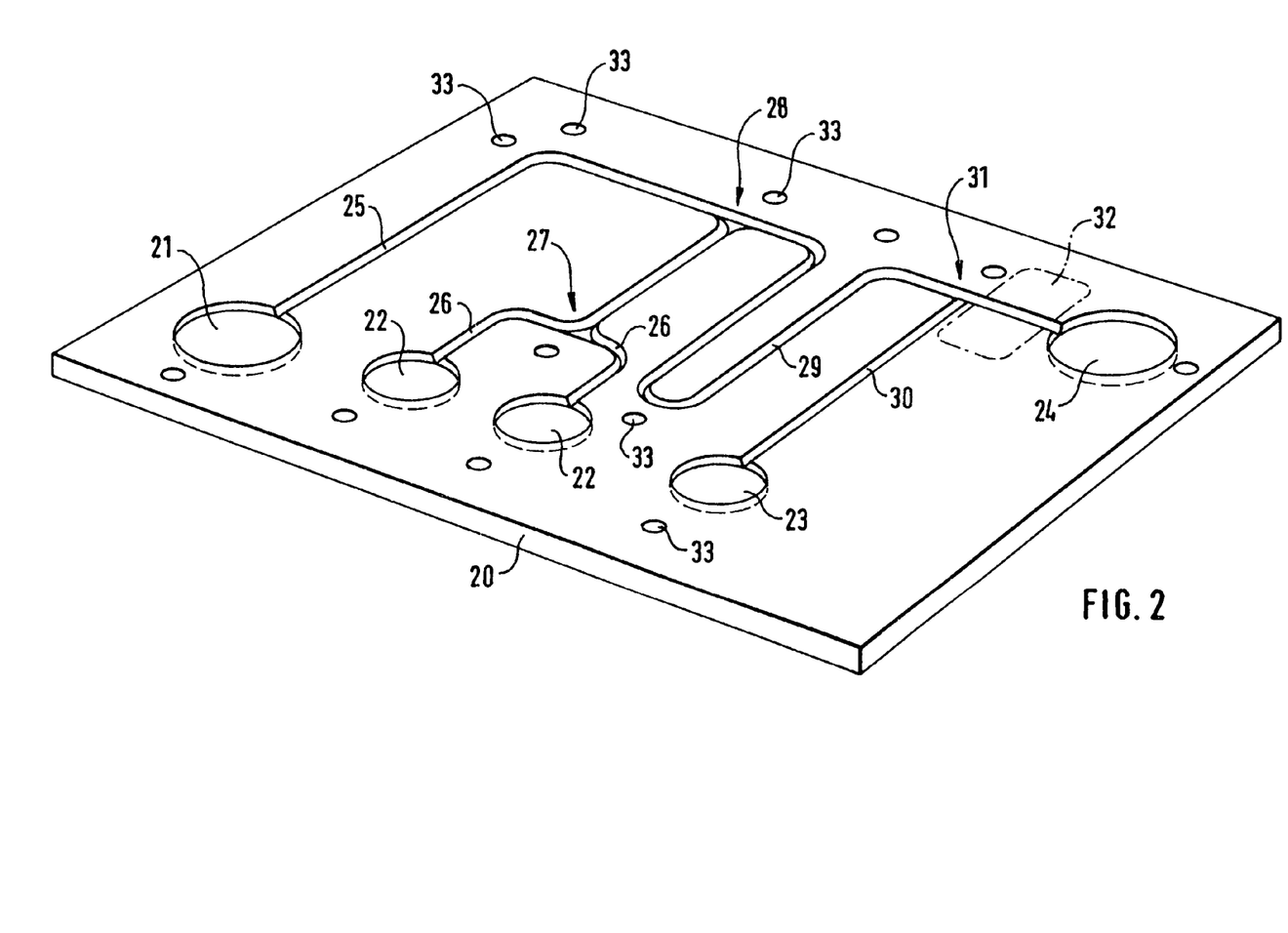
FIG. 2 A laboratory microchip for use in a device according to the invention.

Another motivation for miniaturization in the field of chemical analysis is to minimize the transport paths of the substances, especially between the substance supply and the respective detection point of a chemical reaction (see FIG. 2). In the fields of liquid chromatography and electrophoresis, it is understood that substances can be separated more quickly in such systems (test results are therefore available more quickly), and individual components can be separated with a higher resolution than is possible with conventional systems. In addition, the amount of substances (especially reagents) that micro-miniaturized laboratory systems use is greatly reduced, and the substance components are mixed much more efficiently.

The above-mentioned background is discussed in detail in an article by Andreas Manz et al. on page 5 ff. of the cited collection. The article also states that the authors have already manufactured a microchip consisting of a layer system of individual substrates that permits a three-dimensional transport of substances.

In contrast to creating a micro-laboratory system on a glass or plastic substrate, systems are mentioned in above-cited article that are based on a silicon-based microstructure. On this basis, apparently already-integrated enzyme reactors (e.g. for a glucose test), micro-reactors for immunoassays, and miniaturized reaction vessels for DNA quick assays have been created using the method of polymerase chain reaction.

A microchip laboratory system of the initially-cited type is also discussed in U.S. Pat. No. 5,858,195 where the relevant substances are moved by a system of connected channels integrated in a microchip. The movement of these substances in these channels can be precisely controlled using electrical fields that are applied along the transport channels. Given the highly-precise control of substance movement that this allows as well as the very precise dosing of the moved substances, the substances can be precisely mixed and separated, and/or chemical or physical-chemical reactions can be induced with the desired stochiometry. In this laboratory system, the integrated channels also have numerous substance reservoirs that contain the necessary substances for chemical analysis or synthesis. These substances are also moved out of the reservoirs along the transport channels by means of electrical differences in potential. The substances moved along the transport channels therefore contact different chemical or physical environments that allow the necessary chemical or chemical-physical reactions to take place between the respective substances. In particular, the prior-art substrate has one or more transport channel intersections at which these substances are mixed. By simultaneously using different electrical potentials at different substance reservoirs, the volumetric flows of the various substances through one or more intersections can be selectively controlled; a precise stochiometric template is therefore possible based just on the applied electrical potentials.

By means of the cited technology, complete chemical or biochemical experiments can be carried out using microchips tailored to the respective application. In handling microchips in measurement setups for experiments, the chips of the measuring system must be easily exchangeable, and the measuring setup must be easily adaptable to different microchip layouts. On the one hand, this adaptability is related to the respective arrangement of the substance reservoirs, the high voltage necessary for moving the substances on the chips, and the corresponding application of the voltage to the microchips. For such a measuring setup, you therefore need to run electrodes to the contact surfaces correspondingly provided on the microchip, and you need devices to supply the substances to the cited reservoirs. In particular, the microchips dimensions can only range from a few millimeters to approximately 1 centimeter which makes the chips relatively difficult to handle.

A relevant arrangement for handling the microchip described at the onset is described in a prior publication, international patent application WO 9 8/05424. This has a base unit with a seat to receive an adapter that in turn receives a removable microchip. Corresponding counterelectrodes are provided on the adapter for the electrodes required to move the substances on the microchip. An electrical contact between the electrodes and the corresponding counterelectrodes is automatically created when the microchip is introduced into the adapter. Furthermore, the adapter itself contains devices that are required for evaluating the experimental measuring results such as a laser source and an associated photocell. In particular, the advantage of the adapter is that the base unit can work with numerous different microchips without having to adapt or even exchange the base unit. The disadvantage of this prior-art system is that the adapter is relatively involved since it e.g. contains the cited optical measuring devices. In particular, there are no devices in this arrangement for supplying the investigated substances and/or the reagents required for the experiment.

Moving substances by high voltage is, however only one variation among other conceivable solutions. For example, the difference in potential necessary to move the substances can also be created by applying a pressurized medium, preferably an inert gas, or another suitable gas medium or a liquid. Of course, when the microchip is subjected to a pressurized medium via a supply line, suitable seals must be supplied at the connecting site between the supply line and the microchip to prevent the pressurized medium from exiting at this connecting site. Alternatively, the movement of the substances can be generated by using a suitable temperature grid where the movement is brought about by thermally dilating or compressing the respective substance.

In particular, the selection of the respective medium to provide potential or force to move the substances on the microchip depends on the physical properties of the substances themselves. With substances that have charged particles, for example charged or ionized molecules or ions, the substances are preferably moved using electrical or electromagnetic fields of suitable strength. The paths traveled by these substances depend in particular on the field strength and how long the field is applied. In contrast, substances that do not have an electrical charge are preferably moved using a flow medium such as an inert gas. Given the very small dimensions of the transport channels in the microchip, only a relatively small volume of air is required on the level of picoliters. For substances that have a relatively large thermal expansion coefficient, a thermal procedure may be recommendable to move them, yet only when the resulting increase in temperature does not influence the kinetics of the reaction during the experiment.

Given the potential complexity of the reactions, the number of required contact electrodes can be several hundred or even more. In addition, these substances can be moved in transport channels with any three-dimensional design, e.g., in troughs or grooves, or hollow channels that are enclosed on all sides. Hollow channels can be filled with a liquid or gelatinous buffer medium to further control or set the precise flow rates of these substances. The flow rates can be precisely set by the applied electrical fields based on the movement of charged particles through such a gel. In addition, it is possible to place to the required reagents or even the investigated substances on the microchip beforehand.

By using a buffer gel or buffer solution, mixtures of charged molecules can be advantageously moved through the medium by an electrical field. Several electrical fields can be applied simultaneously or sequentially to separate substances or correspondingly supply the respective substances on a precise schedule, possibly with different time gradients. This procedure can be used to create complex field distributions or fields that migrate beyond the separating medium. Charged molecules that travel through gels with a greater degree of mobility than other substances can thereby be separated from slower substances with less mobility. The precise spatial and temporal distribution of the fields can be determined by corresponding control or computer programs.

In addition, micromechanical or micro-electricomechanical sensors are presently being considered for use in the cited area of microfluid engineering, e.g. micromechanical valves, motors or pumps. A corresponding perspective on possible future technologies in this field is provided by a relevant article by Caliper Technologies Corporation that can be retrieved on the Internet at "www.Calipertech.com".

When this new technology becomes accepted by the affected circle of users, the cited microchips will quickly become a mass-produced article and catch on similar to immunoassays as a quick test in the fields of laboratory diagnostics and clinical diagnostics. There is therefore a substantial need for a measuring setup for the practical handling and operating of such a microchip that simplifies manipulation of the chips so that they can be used in the cited laboratory environment quickly and easily in the fields of chemistry, biology or medicine by lab assistants who generally have a relatively low amount of technical skill.

This would also allow corresponding large-scale acceptance of the chips and relatively easy and quick evaluation of the measuring results. In addition to the appropriate and easy manipulation of the chips, users should have to deal as little as possible with the cited supply devices (especially for any required high voltage) or any other necessary technical devices.

With the discussed systems, the connecting elements between the supply lines of the supply devices and corresponding means of conveyance on the microchip are in particular subject to more-or-less strong mechanical, electrical or chemical wear or corrosion, and are often strongly soiled when they directly contact the substances on the microchip. Of particular significance is that the utilized substances (especially the reagents) in many of the relevant chemical experiments require an extremely high degree of purity. The slightest amount of impurities in the supply lines can substantially falsify the measurement results. In addition, a generic device should be easily and quickly convertible for measurements using microchips with different layouts.

The cited problems are solved with a device according to the invention for operating or manipulating a cited laboratory microchip by providing a releasable interface element between the supply unit and the microchip to bridge or provide a conductive connection to the supply lines with the microfluid structure. The suggested interface element hence primarily allows the supply devices to be easily adapted to microchips with different layouts. In addition, only the interface element directly contacts the microchip and can become soiled or worn. The interface elements can therefore be advantageously exchanged with new elements between individual experiments to reduce to a minimum the danger of contamination by substances on the microchip.

The suggested interface element preferably has electrodes or supply channels for supplying the microchip with electrical, mechanical or thermal energy by means of which the necessary potential can be generated for the microfluid movement of the substances on the microchip. If the substances on the microchip are moved by means of a pressurized medium such as an inert gas, a similar gas medium or a liquid, supply channels are provided in the interface element to supply the microchip with this pressurized medium.

In an altered embodiment where additional supply means are provided to supply the microchip with at least some of the necessary substances for processing (especially analyzing or synthesizing), the interface element has corresponding supply channels to supply the microchip with these substances.

Of course corresponding seals need to be provided here as well to prevent the liquids or gases from exiting, especially when they are under pressure.

The interface element according to the invention can also be formed by a substrate especially consisting of a ceramic or polymer material in which the cited electrodes or supply channels are embedded. With these materials, the interface element can be highly resistant to the utilized chemical substances, and they can also be easily cleaned with chemicals and then reused.

In an advantageous development of the inventive idea, the interface element can be affixed to the supply means by a bayonet block. Such an attachment allows the interface element to be easily and quickly exchanged, e.g., after each experiment.

In addition, a first coding means can be on the interface element for identification that interacts with a corresponding second coding means on the supply means. This measure makes the device according to the invention particularly safe to use since it effectively prevents interface elements that are incompatible with the supply from being accidentally used or installed.

In addition, the microchip can be in a first assembly, and the supply means as well as the interface element can be in a module releasably connected to a second assembly. The module is preferably designed as an insertable cassette or cartridge. The entire device can be designed to be set up as a stationary unit or a portable device for ambulatory local experiments, e.g., for a patent. In a first embodiment, the suggested module has the cited first supply means. The substances required for the respective experiment are either supplied along separate paths to the microchip or via a second supply unit that also can preferably be in the suggested module.

To further increase operational reliability, a magnetic/Hall sensor can be provided to identify or recognize the second assembly or determine the presence of a module (cartridge) in the second assembly, and a shut-off device or warning device that works with the sensor can also be provided.

Other tasks, advantages, and features of the device according to the invention can be found in the following description of the exemplary embodiment. Shown in particular are.

The functional components required for the laboratory microchip system under discussion and the corresponding functional sequence in an experiment are schematically represented in FIG. 1. In this functional sequence, a microchip (outlined in FIG. 2) is required. In this drawing, a distinction is drawn between the material flow 1 that arises in such a system (i.e. the investigated substances or the used reagents) and the information flow 2 in relationship to the controlled movement of the individual substances on the microchip, and in relation to the detection of the experimental results.

The substances to be investigated (possibly along with the required reagents for the respective experiment) are first fed to the microchip 3 where the material is to flow. Then the substances are moved or transported 4 on the microchip (e.g., by means of electrical force in the case of ionized substances). Both the supply and the movement of the substances are generated by suitable control electronics 7 as indicated by be dashed line. In the present example, the substances are pretreated 5 before they are subjected to the actual experiment. They can be e.g. pre-heated by a heater, or pre-cooled by a suitable cooling device to precisely reproduce the thermal test conditions. Of course, the temperature of a chemical experiment normally substantially influences the experimental kinetics. As indicated by the arrow, this pretreatment can also be sequential, whereby a pretreatment cycle 5 and another transport cycle 4' are correspondingly triggered. The cited pretreatment is particularly useful for separating substances so that only specific components of the starting substance will be available for the respective experiment. Basically, both the amount of substance (quantity) as well as the rate of the substance (quality) can be determined by the described means of transport. In particular, by precisely setting the amount of substance, the individual substances or substance components can be precisely dosed. The last-cited steps are also preferably controlled by means of control electronics 7.

The actual experiment may occur after several pretreatments; the experimental results can be detected 6 at a suitable detection point on the microchip. The means of detection are preferably optical, e.g., a laser diode is used together with a photocell, perhaps a connected mass spectrometer, or electrical detection can be used. The resulting optical measurement signals are sent to a signal-processing device 8 and then to an evaluation unit (e.g. a suitable microprocessor) to interpret 9 the measurement results.

After the above-cited detection 6 occurs, other test series, analyses or substance separations can occur (as indicated by be dashed line), e.g., in conjunction with various stages of a complex chemical experiment. To this end, the substances are transported further 4" on the microchip after the first detection point 6 and moved to a different detection point 6'. At this point, steps 4' and 6 are basically repeated. Finally, the substances are supplied to a drain (not shown) in a final transport cycle or collection cycle 4''' after all the reactions or experiments are over.

FIG. 2 shows a typical laboratory microchip that is suitable for use in a device according to the invention. Let us first describe this microchip in detail since it substantially influences the construction of the device to operate the microchip according to the invention described below. Microfluid structures have been created in the displayed top of a substrate or carrier 20 to receive and transport the substances. The substrates 20 can be created by chemical etching, laser etching, or micro-injection molding.

There are one or more recesses 21 on the substrate that serve as reservoirs for the investigated substance (termed substance sample in the following) to be received by the microchip. In the experiment, the substance sample is first moved along a transport channel 25 in the microchip. In the present exemplary embodiment, the transport channel 25 is formed by a V-shaped trough. However, any other design is possible for transport channel, e.g. rectangular or circular recesses or grooves.

The required reagents for the experiment are introduced into other recesses 22 also serving as substance reservoirs. The present example concerns two different substances. Via corresponding transport channels 26, they are first fed to an intersection 27 where they mix and (possibly after a chemical analysis or synthesis) they form the product that is finally used. This reagent contacts the substance sample to be investigated at another intersection 28 where both substances mix.

The substance formed in this manner then passes through a meandering transport channel section 29 that basically serves to artificially lengthen the path available for the reaction between the substance sample and the reagents. In another recess 23 serving as a substance reservoir, there is another reagent in the present example that is fed to the existing substance mixture at another intersection 31.

In this example, it is assumed that the actual investigated substance reaction occurs directly after the cited intersection 31, and the reaction can be detected within an area 32 (or measuring field) of the transport channel by means of a detector (not shown) preferably without contact. The corresponding detector can be above or below the area 32. After the substance passes through the cited area 32, it is fed to another recess 24 that forms a drain for the waste created during the reaction.

Finally, there are recesses 33 in the microchip that serve as contacts for introducing electrodes, and that allow the required electrical voltage or high voltage to operate the microchip. Alternately, the chip can be contacted by directly introducing corresponding electrode tips into the recesses 21, 22, 23, 24 provided for receiving the substances. By suitably arranging the electrodes 33 along the transport channels 25, 26, 29, 30 and correspondingly harmonizing the sequence and/or strengths of the used fields, the individual substances can be moved according to a precisely set sequence and rate so that the kinetics of the basic reaction process can be precisely controlled or maintained. When the substances are moved within the microfluid structure propelled by gas pressure, it is necessary to design the transport channels as enclosed lines, e.g. as hollow channels with any desired cross section. With this embodiment, the recesses 33 must be designed so that the corresponding pressure supply lines that end in them provide a seal so that the pressurized medium (such as an inert gas) can be introduced into the transport channels.

Figure 3:
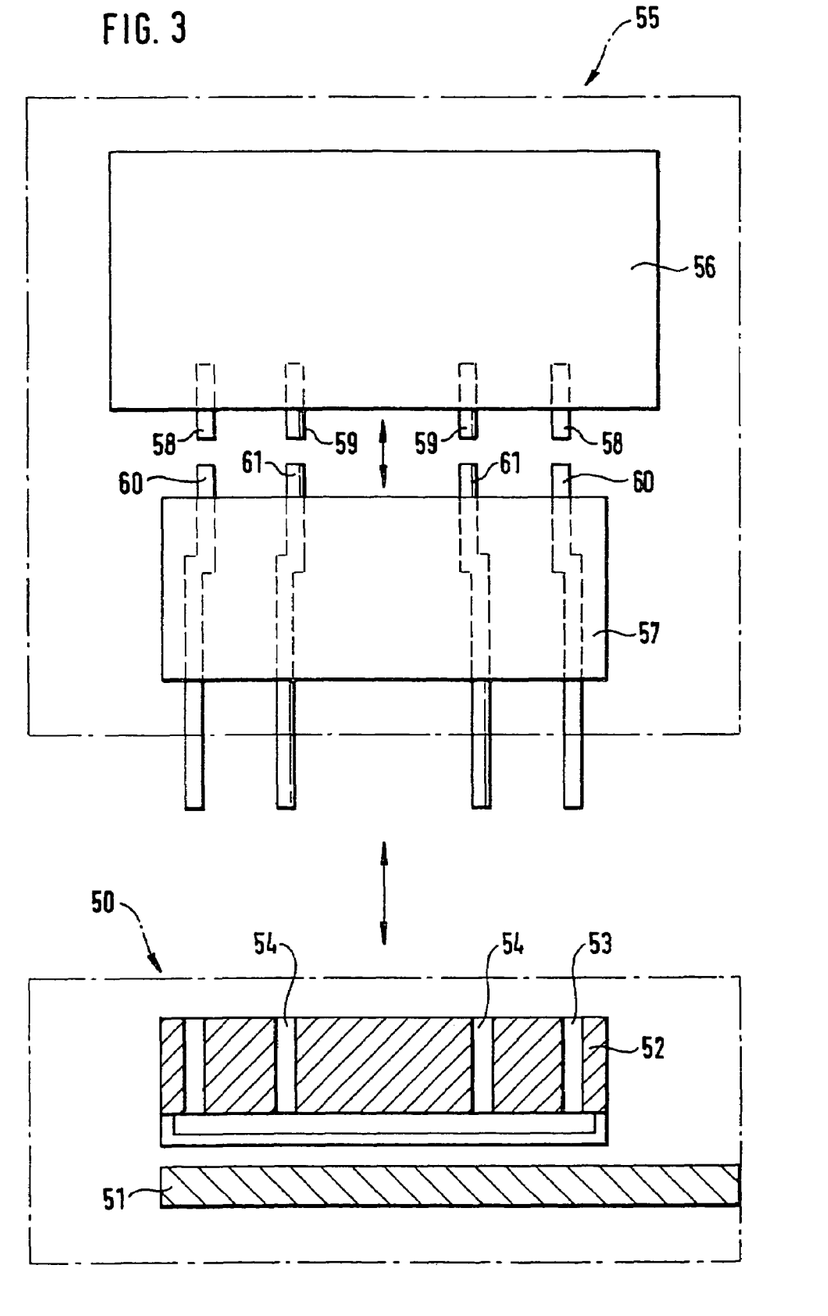
FIG. 3 A block diagram of an exemplary embodiment of the device according to the invention to operate a laboratory microchip.

The basic design of the device according to the invention to operate the described microchip will now be further explained with reference to the block diagram of the preferred exemplary embodiment shown in FIG. 3. The individual components of the overall device are strictly modular to allow the greatest possible flexibility when operating the device. A first assembly 50 has a mounting plate 51 to receive the initially-described microchip 52. In this example, the microchip 52 contains two different types of connecting elements. On the one hand, these are recesses 53 to receive electrical contacts to provide the required electrical voltage for moving the substances on the microchip. These recesses 53 can either serve as a mechanical seat for electrode tips (where the electrode tips are directly immersed in the substances to be moved), or they themselves represent electrodes, e.g. by suitably metallizing the inner surface of the recesses. In addition, the possibly metallized recesses (not shown) can be connected with other electrode surfaces on the microchip that provide the required electrical field to move the substances. Such electrode surfaces can also be manufactured using prior-art coating techniques.

On the other hand, the microchip contains recesses 54 to receive substances, especially reagents for chemical analyses. In addition, a second assembly 55 is provided that contains the required supply devices 53 for operating the microchip 52. By miniaturizing the corresponding components, the supply devices 56 preferably represent a microsystem that provides the required electrical voltage or pressurized medium via corresponding electrodes 58 (or lines 58 for a pressure supply system) in the form of a cartridge that can be inserted in the assembly 55. If the microchip is supplied with electricity, the electrical voltage can be miniaturized using conventional integrated circuitry; if pressure is supplied, the miniaturization can be provided by corresponding techniques familiar in the fields of modern laboratory technology or micromechanics. The supply containers for the compressed gas can also be integrated since, as mentioned, the required gas volume is on the level of picoliters.

In the present exemplary embodiment, the second assembly 55 has in particular an intermediate carrier 57 according to the invention that functions as an interface element and is releasably connected to the supply device 56. The intermediate carrier provides electrical paths or connecting channels 60 by means of which the electrodes 58 or channels of the supply device 56 and the assigned counterelectrodes 53 of the microchip can be bridged or conductively connected. Correspondingly, connecting lines 61 can be provided as a bridge to supply substances.

On one hand, the cited bridging serves to prevent the wear and soiling of the supply device 56 electrodes that arises when they contact the microchip in that the intermediate carrier basically assumes this role as a "disposable" article. As shown in the present exemplary embodiment, the intermediate carrier can also serve to spatially adapt the supply device 56 electrodes to the respective surface or spatial arrangement of the microchip's electrode surfaces. The entire measuring and operating device can be advantageously adapted to a special microchip layout just by exchanging the cartridge 56 and/or the intermediate carrier 57. In addition, by exchanging the entire cartridge including the intermediate carrier, the handling device can be quickly and easily adapted to different test series or types of operation, as for example when changing from an electrical to gas supply of the microchip.

Let it be noted that the interface element according to the invention is also modular and can correspondingly be multifunctional. This functionality can for example be realized by a multilayer arrangement of channels including supply elements that correspondingly lead outward. It is, for example, possible to switch between experiments that use the same microchip by simply rotating the interface element on its axis (e.g., 90 degrees). Different channels or channel systems can be activated in the microchip depending on respective rotational angle. In particular, the existing rotational angle can correspondingly connect different supply means to different channels. The interface element can be advantageously very thin or flat, e.g. in the form of a check card, to make it easier to use. In addition, suitable seals can be provided in the lines or channels of the interface element to insulate to the outside the required voltage for operating the microchip to avoid accidents or, when a flow of substance or gas is used, suitable seals can be provided to prevent the substances from exiting after connecting the interface element with the supply device and microchip.

Figure 4A:
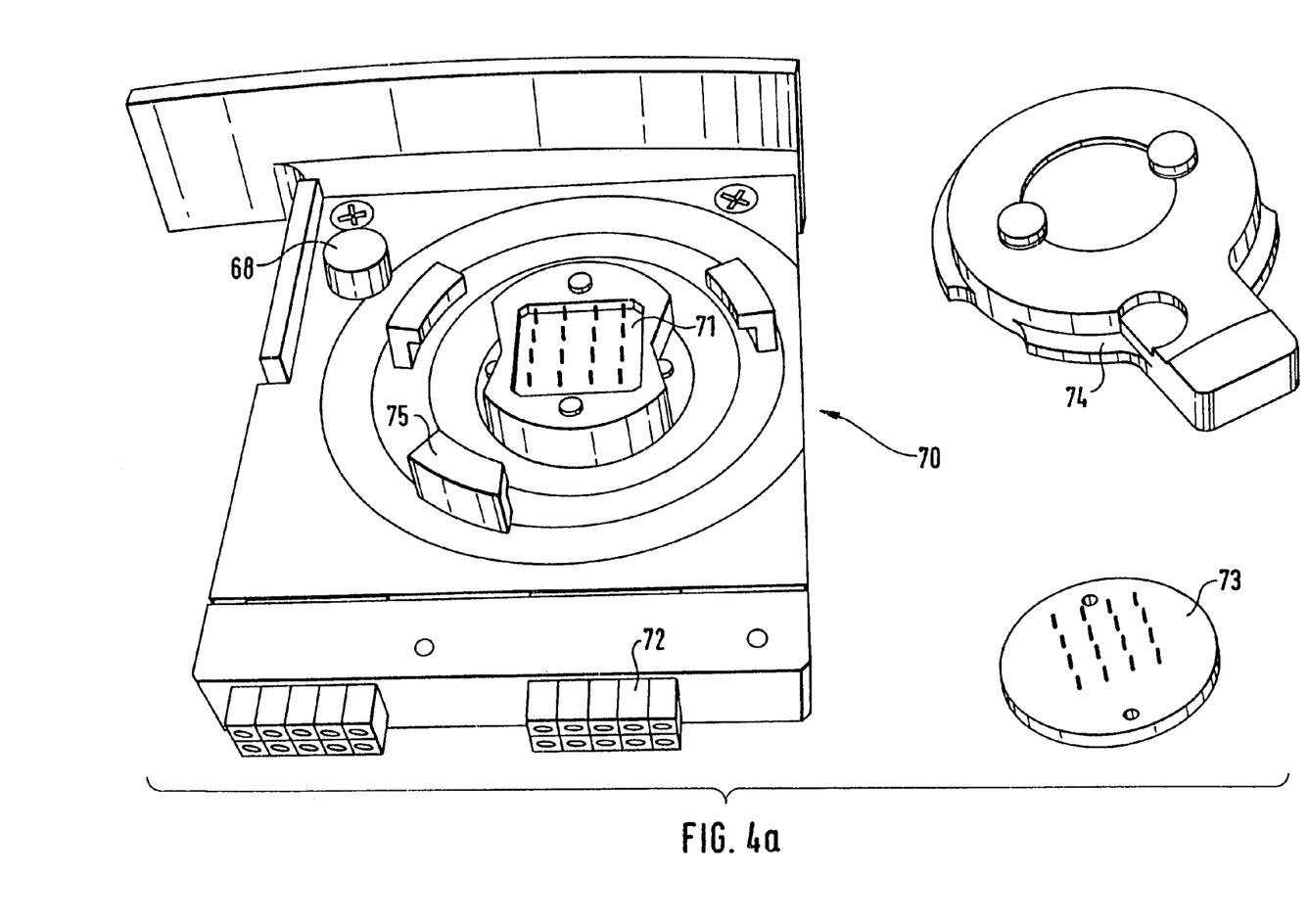
FIGS. 4a-d A schematic sequence of illustrations of the operating steps of a preferred exemplary embodiment of the invention where a module according to the invention is realized as an exchangeable cartridge.

FIGS. 4*a*-*d* show a preferred embodiment of the invention with an exchangeable cartridge. In particular, a schematic sequence of drawings is shown to illustrate the typical operating steps of the suggested device. In this series of pictures, corresponding components are given the same reference numbers. FIG. 4*a* shows a cartridge 70 in which is integrated a supply system (not shown) for a microchip. The supply lines of the supply system lead to the outside via a corresponding contact electrode field 71. In the present exemplary embodiment, the electrode field is designed as an exchangeable contact plate 71 e.g. made of a fluorinated polymer or ceramic. The contact electrodes 71 can be designed as conventional spring pins. The cartridge is connected to the internal basic supply system (not shown) of the entire handling device via plug connections 72 that mate conventionally with corresponding counter pieces in the second assembly, and activate the corresponding contact connections when the cartridge is inserted into the assembly.

In the present embodiment, the contact electrodes of the supply system contact the corresponding contacts on the microchip via the intermediate carrier 73 according to the invention that bridges the contact electrodes without changing their spatial arrangement in relationship to the microchip in contrast to the previously-described exemplary embodiment. The basic advantages of the intermediate carrier 73 have already been described. The intermediate carrier is releasably connected to the cartridge via a bayonet lock 74, 75. A corresponding bayonet holder 75 is therefore provided on the cartridge 70 to receive a bayonet 74. The bayonet lock 74, 75 allows the intermediate carrier 73 to be quickly and easily exchanged as a replacement, single-use or disposable part, e.g. after each experiment.

Figure 4B:
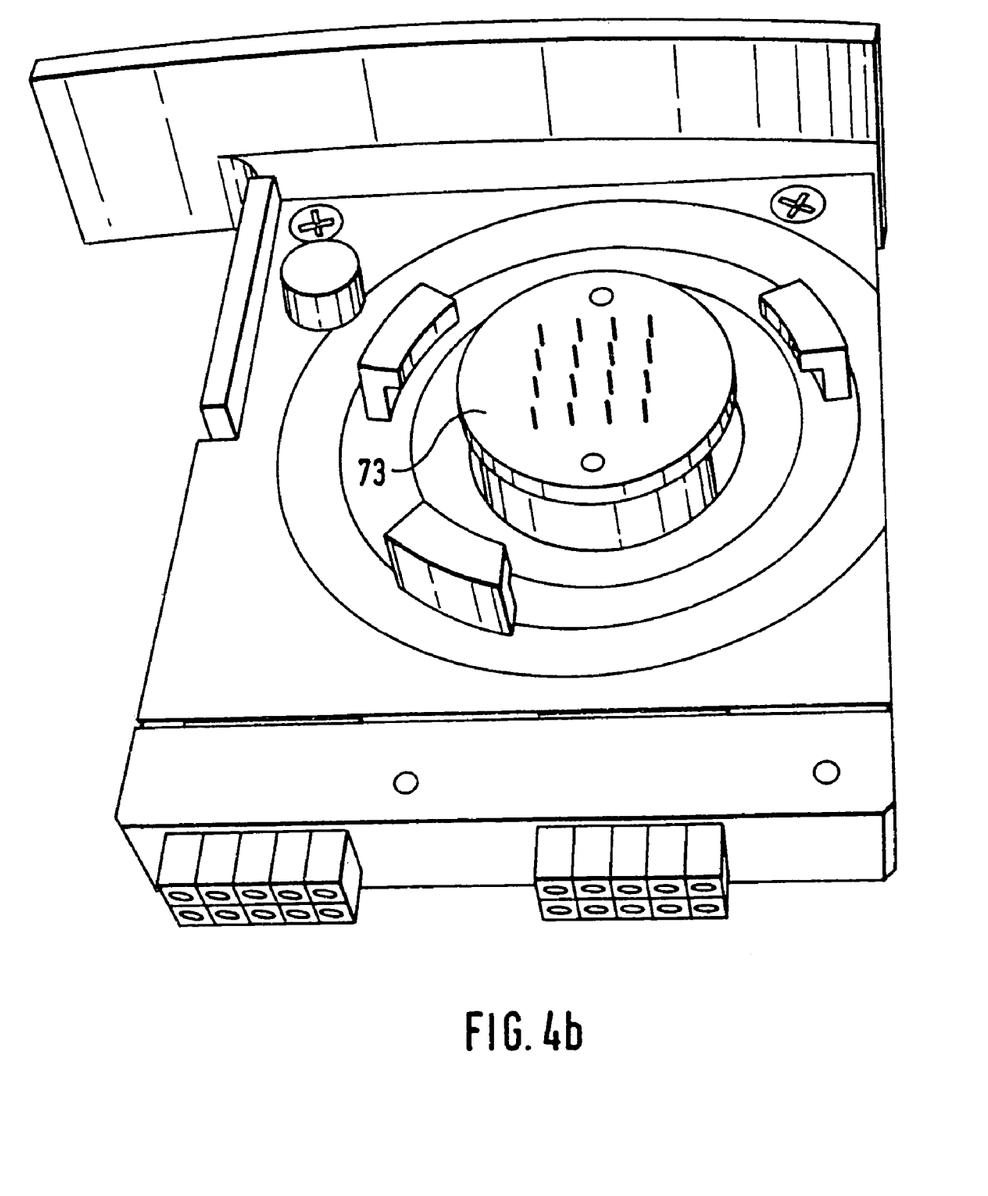
Figure 4C:
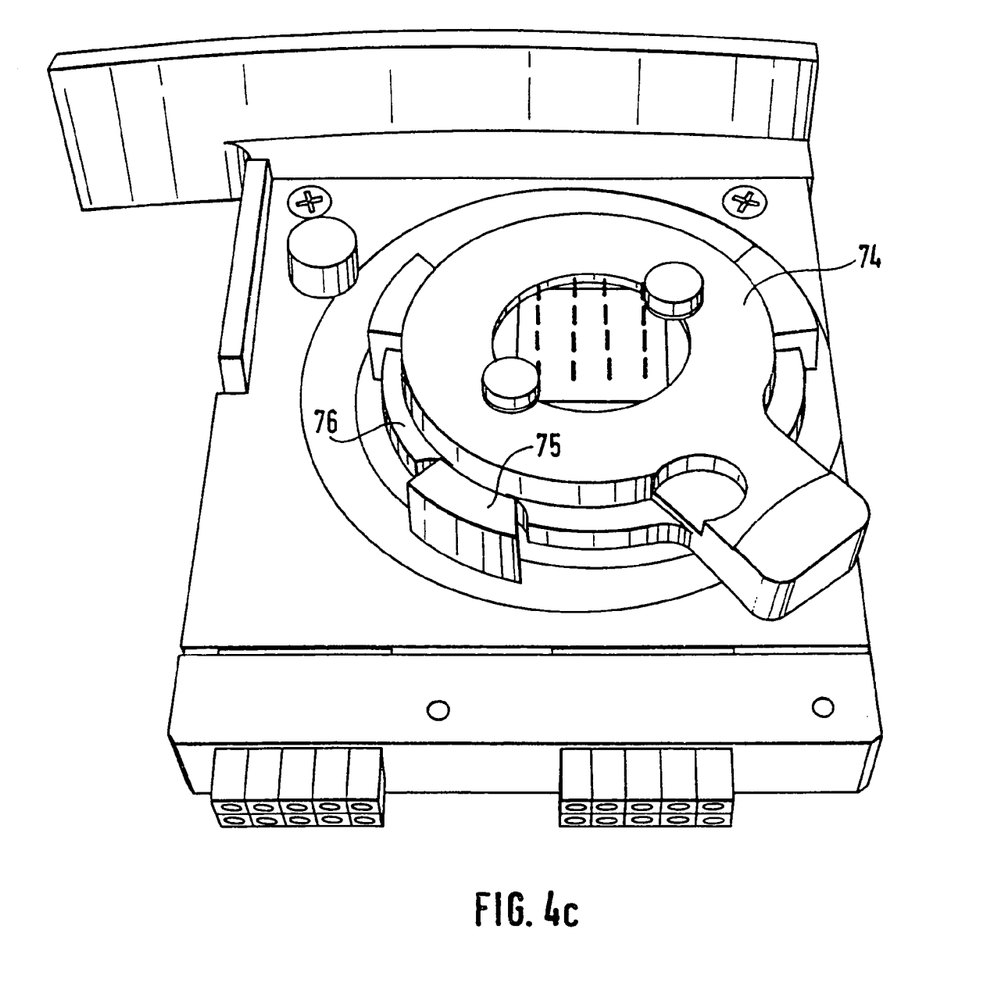

FIGS. 4b and c illustrate individual installation steps for installing the intermediate carrier 73 in the cartridge 70. Corresponding to FIG. 4b, the intermediate carrier 73 is first inserted into the cartridge 70 in the installation position and then, as shown in FIG. 4c, affixed to the cartridge 70 by means of the bayonet lock 74, 75. A ring section 76 of the bayonet 74 mates with the corresponding threaded bayonet part 75. Another advantage of the cartridge (module) suggested according to the invention is shown in FIGS. 4b and c; the intermediate carrier 73 can be easily installed in the cartridge after the cartridge 70 is removed from the assembly.

Finally, FIG. 4 shows how a correspondingly preassembled cartridge can be installed in a device housing 77 containing all the cited assemblies. In the shown exemplary embodiment, the cartridge 70 is inserted into a slot in the second assembly 78. However, other means of fixation are conceivable, e.g. a snap log or a magnetic lock. When the second assembly 78 is closed, it contacts the microchip-holding first assembly 79 and automatically creates the necessary line connections for operating the microchip.

To further increase operational reliability, there can be a magnet 68 (FIG. 4a) on the cartridge 70 and a Hall sensor 69 (FIG. 4d in which the magnet is covered by the shown hand) that interacts with the magnet 68. The Hall sensor 69 is in the housing part under the mounting plate 67 (in FIG. 3, reference number 51) in the present exemplary embodiment at the height of the surface drawn in a dashed line and hence not visible. The magnet 68 and the Hall sensor 69 can serve to identify a cartridge as well as a corresponding control for the entire device adapted to a specific cartridge type. These components can also serve to check the compatibility between the installed (or to be installed) cartridge and an existing microchip. To this end, a suitable or conventional switch-off or warning device (not shown) can be provided.

Figure 4D:
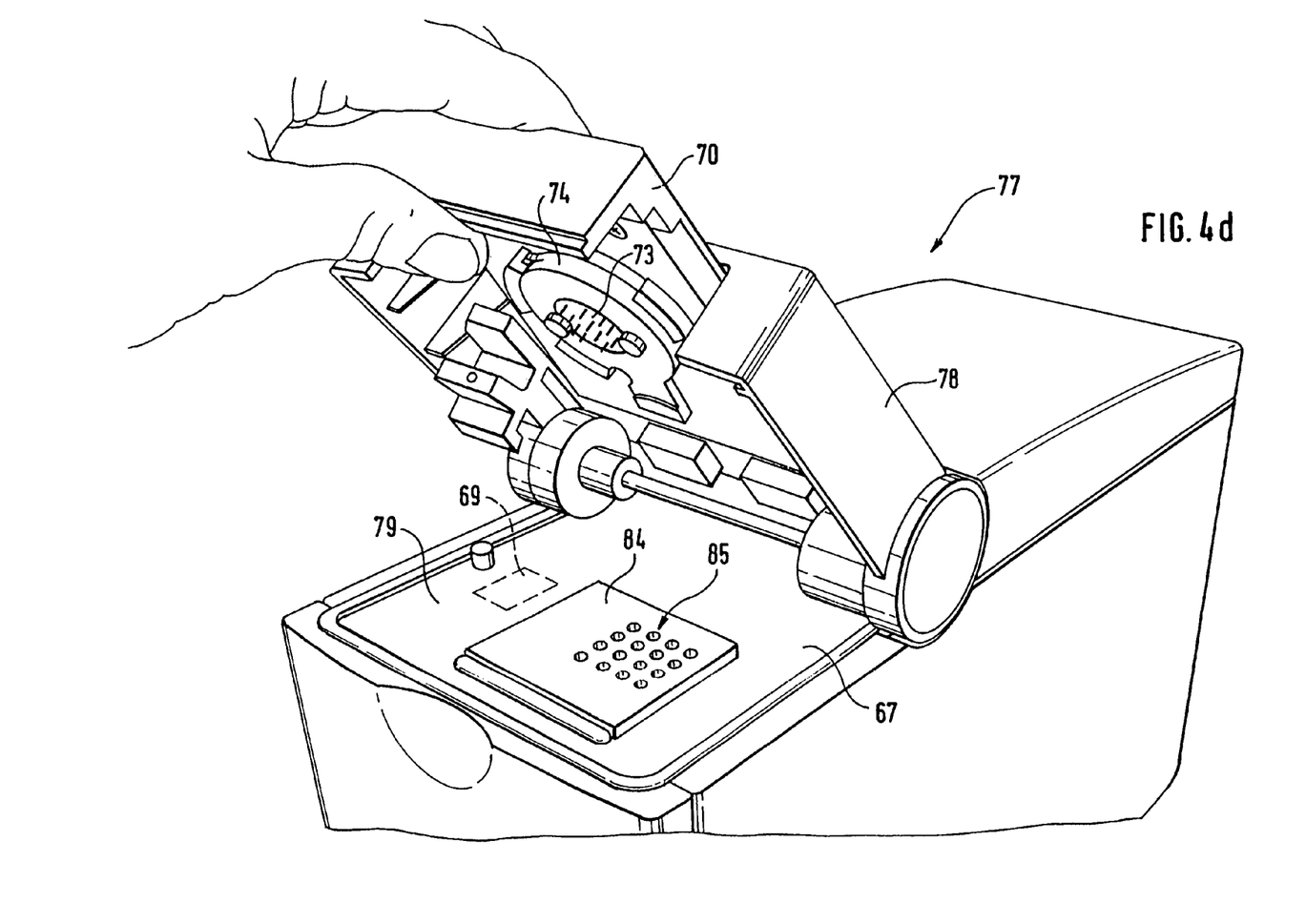
Figure 5A:
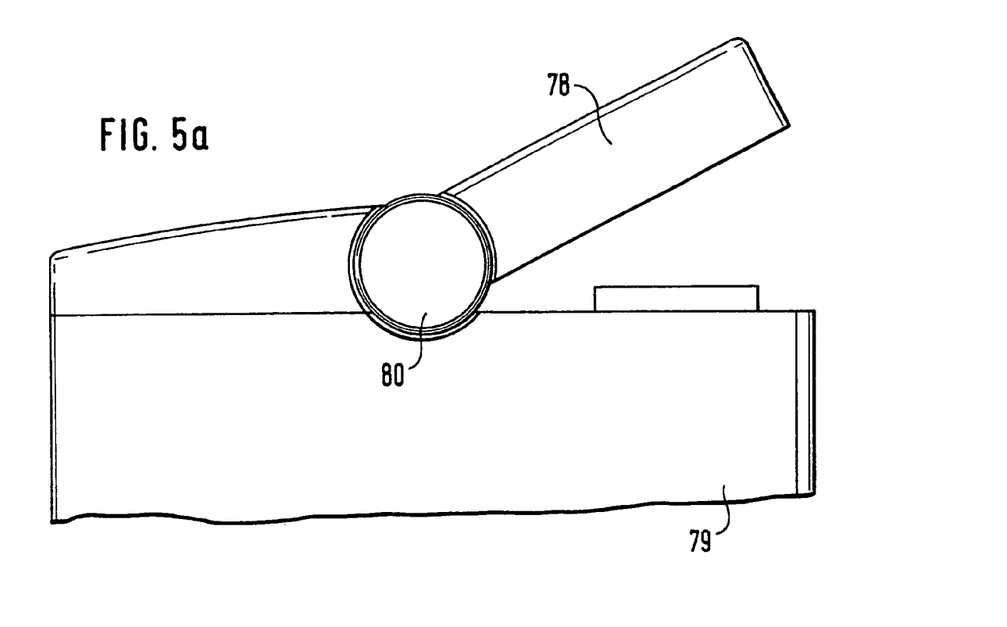
FIGS. 5a-b An exemplary embodiment in which two assemblies of the device according to the invention are connected to each other by means of an articulation.
Figure 5B:
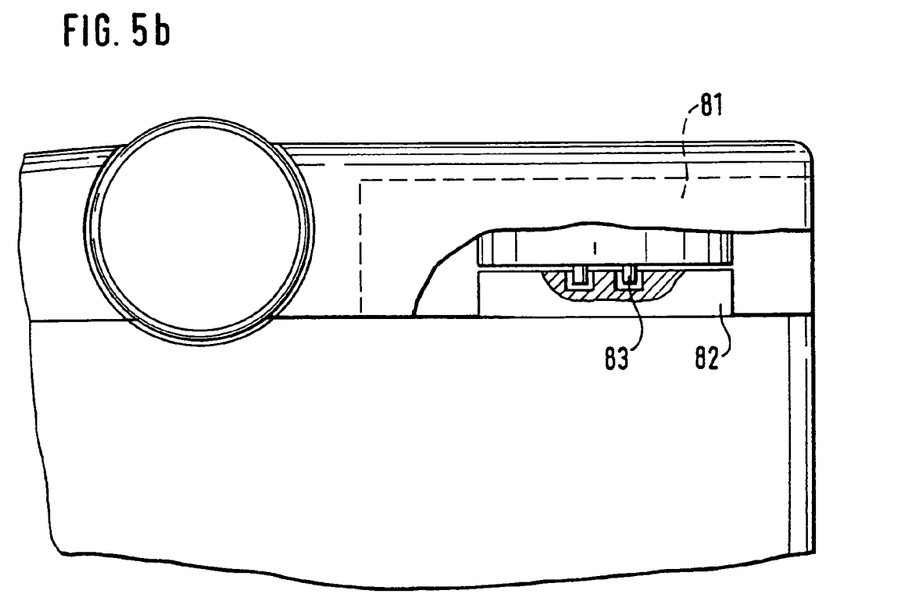

Finally, FIGS. 5a, b schematically illustrate an embodiment of the device housing 77 corresponding to FIG. 4d where the two components 78, 79 according to the invention are connected via an articulation 80. The advantageous spatial arrangement of the articulation is such that the contact pins 83 on the intermediate carrier 81 do not become skewed when they are inserted in the assigned recesses in the microchip which, in a worse-case scenario, could destroy the contact pins 83 or even the microchip 82.

The invention claimed is:

1. A device for operating a microchip with a microfluidic structure, the microchip including supply elements for supplying substances to the microfluidic structure and structures for receiving potentials, the structures for receiving potentials being such as to cause movement of the substances in the microfluidic structure, the device comprising:
a supply unit for supplying the potentials for moving the substances in the microfluidic structure, the supply unit having first supply lines for the potentials to be coupled to the potential receiving structures,
an interface element,
a holder for selectively holding the interface element, the holder having a structure for cooperating with the interface element and for enabling the interface element to be physically connected to and physically disconnected from the holder, the holder having second supply lines for the potentials to be coupled to the potential receiving structures of the microchip, the second supply lines being adapted to be connected to the first supply lines,
the interface element having coupling structures for supplying the potentials from the second supply lines to the potential receiving structures of the microchip corresponding with the coupling structures in response to the first and second supply lines being connected and the potentials being supplied to the first supply lines,
the interface element and the holder structure for enabling the interface element to be physically connected to and physically disconnected from the holder being arranged so that the coupling structures of the interface element between the second supply lines and the corresponding potential receiving structures of the microchip are (a) physically connected together in response to the physical connection occurring between the holder and the interface element, and (b) physically disconnected from each other in response to the physical disconnection occurring between the holder and the interface element,
the interface element having a first surface that faces a surface of the microchip while (a) the physical connection occurs between the holder and the interface element and (b) the interface element supplies the potentials to the potential receiving structures of the microchip, the first surface of the interface element having a surface area that is not substantially different from the surface area of the facing surface of the microchip,
the interface element having a second surface that faces only a segment of the holder while the physical connection occurs between the holder and the interface element.

2. The device according to claim 1, wherein the interface element includes an electrically insulating substrate in which the electrodes and channels are embedded.

3. The device according to claim 1, wherein the holder structure for enabling the interface element to be physically connected and physically disconnected to the interface element includes a bayonet lock for releasably attaching the interface unit to the supply unit.

4. The device according to claim 1, wherein the interface element and the supply unit respectively include a first coding element for identifying the interface element, a second coding element on at least one of the supply units and the microchip, the first and second coding elements corresponding with each other and interacting with one another.

5. The device of claim 1 wherein the potential is electrical.

6. The device of claim 5 wherein the coupling structures of the interface element include contact electrodes including spring pins.

7. The device of claim 1 wherein the potential is mechanical.

8. The device of claim 1 wherein the potential is fluidic.

9. The device of claim 1 wherein the potential is thermal.

10. The device of claim 1 wherein the supply unit, interface element and holder include channels adapted to mate and for supplying fluid to the microchip in response to the interface element being physically connected to the holder and microchip.

11. The device of claim 1 wherein the supply unit and the holder have structures for enabling the holder to be physically connected to the supply unit and physically disconnected from the supply unit so that when the supply unit and the holder are physically connected the first and second supply lines are connected, and when the supply unit and the holder are physically disconnected there are no connections between the first and second supply lines.

12. The device of claim 11 wherein the potential is electric and the interface element includes an electrically insulating substrate carrying electrodes for supplying the electrical potentials to the potential receiving structures of the microchip, the coupling structures of the interface element including the electrodes.

13. The device of claim 12 wherein the electrodes include spring pins.

14. The device of claim 1 wherein the potential is electric and the interface element includes an electrically insulating substrate carrying electrodes for supplying the electrical potentials to the potential receiving structures of the microchip, the coupling structures of the interface element including the electrodes.

15. The device of claim 14 wherein the electrodes include spring pins.

16. The device of claim 15 wherein the supply unit is adapted to carry the microchip while the holder is physically connected to the supply unit.

17. The device of claim 11 wherein the supply unit is adapted to carry the microchip while the holder is physically connected to the supply unit.

18. The device of claim 1 wherein the interface element is made of a material chemically resistant to substances adapted to be moved in the microfluidic structure.

19. The device of claim 1 wherein the interface element is made of a material chemically resistant to cleaning agents for the interface element.

20. A device for operating a microchip with a microfluidic structure, the microchip including supply elements for supplying substances to the microfluidic structure and structures for receiving electric potentials, the structures for receiving electric potentials being such as to cause movement of the substances in the microfluidic structure, the device comprising:
   a supply unit for supplying the electric potentials for moving the substances in the microfluidic structure, the supply unit having first electric supply lines for the electric potentials to be coupled to the electric potential receiving structures,
   an interface element including an electrically insulating substrate carrying electrodes for supplying the electric potentials to the electric potential receiving structures of the microchip corresponding with the electrodes, the electrodes including spring pins,
   a holder for selectively holding the interface element, the holder having a structure for cooperating with the interface element and for enabling the interface element to be physically connected to and physically disconnected from the holder, the holder having second electric supply lines for the electric potentials to be coupled to the electric potential receiving structures of the microchip, the second electric supply lines being adapted to be connected to the first electric supply lines,
   the interface element electrodes forming coupling structures for supplying the electric potentials from the second electric supply lines to the corresponding electric potential receiving structures of the microchip in response to the first and second electric supply lines being electrically and physically connected and the electric potentials being supplied to the first electric supply lines,
   the interface element and the holder structure for enabling the interface element to be physically connected to and physically disconnected from the holder being arranged so that the coupling structures of the interface element between the second electric supply lines and the corresponding electric potential receiving structures of the microchip are (a) electrically and physically connected together in response to the physical connection occurring between the holder and the interface element, and (b) electrically and physically disconnected from each other in response to the physical disconnection occurring between the holder and the interface element,
   the interface element having a first surface that faces a surface of the microchip while (a) the physical connection occurs between the holder and the interface element and (b) the interface element supplies the electric potentials to the electric potential receiving structures of the microchip,
   the interface element having a second surface that faces a surface of the holder while the interface element is physically connected to the holder.

21. The device of claim 20 wherein the supply unit and the holder have structures for enabling the holder to be physically connected to the supply unit and physically disconnected from the supply unit so that when the supply unit and the holder are physically connected the first and second electric supply lines are electrically and physically connected, and when the supply unit and the holder are physically disconnected there are no electrical or physical connections between the first and second electric supply lines.

22. The device of claim 20 wherein the interface element is made of a material chemically resistant to substances adapted to be moved in the microfluidic structure.

23. The device of claim 20 wherein the interface element is made of a material chemically resistant to cleaning agents for the interface element.

24. An interface element for use with a system including (a) a microchip including a (i) microfluidic structure, (ii) supply elements for supplying substances to the microfluidic structure and (iii) structures for receiving potentials, the structures for receiving potentials being such as to cause movement of the substances in the microfluidic structure, (b) a supply unit for supplying the potentials for moving the substances in the microfluidic structure, the supply unit having first supply lines for the potentials to be coupled to the potential receiving structures, (c) a holder for selectively holding the interface element, the holder having a structure for cooperating with the interface element and for enabling the interface element to be physically connected to and physically disconnected from the holder, the holder having second supply lines for the potentials to be coupled to the potential receiving structures of the microchip, the second supply lines being adapted to be connected to the first supply lines,
   the interface element comprising:
      coupling structures for supplying the potentials from the second supply lines to the potential receiving structures of the microchip corresponding with the coupling structures in response to the first and second supply lines being connected and the potentials being supplied to the first supply lines,
   the interface element being arranged so that the coupling structures of the interface element between the second supply lines and the corresponding potential receiving structures of the microchip are (a) physically connected together in response to the physical connection occurring between the holder and the interface element, and (b) physically disconnected from each other in response to the physical disconnection occurring between the holder and the interface element, the interface element having a first surface that faces a surface of the microchip while (a) the physical connection occurs between the holder and the interface element and (b) the interface element supplies the potentials to the potential receiving structures of the microchip, the first surface of the interface element having a surface area that is not substantially different from the surface area of the facing surface of the microchip, the interface element, while physically connected to the holder, having a second surface facing only a segment of a portion of the holder, the first and second surfaces of the interface element having about the same surface areas.

25. The interface element of claim 24 wherein the potential is electrical and the coupling structures of the interface element include contact electrodes including spring pins, the interface element including an electrically insulating substrate carrying the spring pins.

26. The interface element of claim 24 wherein the interface element is made of a material chemically resistant to substances adapted to be moved in the microfluidic structure.

27. The interface element of claim 24 wherein the interface element is made of a material chemically resistant to cleaning agents for the interface element.

28. An interface element for use with a system including (a) a microchip including (i) a microfluidic structure, (ii) supply elements for supplying substances to the microfluidic structure and (iii) structures for receiving electric potentials, the structures for receiving electric potentials being such as to cause movement of the substances in the microfluidic structure, (b) a supply unit for supplying the electric potentials for moving the substances in the microfluidic structure, the supply unit having first electric supply lines for the electric potentials to be coupled to the electric potential receiving structures, (c) a holder for selectively holding the interface element, the holder having a structure for cooperating with the interface element and for enabling the interface element to be physically connected to and physically disconnected from the holder, the holder having second electric supply lines for the electric potentials to be coupled to the electric potential receiving structures of the microchip, the second electric supply lines being adapted to the connected to the first electric supply lines, the interface element comprising:

an electrically insulating substrate carrying electrodes for supplying the electric potentials to the electric potential receiving structures of the microchip corresponding with the electrodes, the electrodes including spring pins, the interface element electrodes forming coupling structures for supplying the electric potentials from the second electric supply lines to the corresponding electric potential receiving structures of the microchip in response to the first and second electric supply lines being electrically and physically connected and the electric potentials being supplied to the first electric supply lines, the interface element being arranged so that the electrodes of the interface element between the second electric supply lines and the corresponding electric potential receiving structures of the microchip are (a) electrically and physically connected together in response to the electrical and physical connection occurring between the holder and the interface element, and (b) electrically and physically disconnected from each other in response to the physical disconnection occurring between the holder and the interface element, the interface element having a surface that faces a surface of the microchip while (a) the electrical and physical connections occur between the holder and the interface element and (b) the interface element supplies the electric potentials to the electric potential receiving structures of the microchip, the interface element, while physically connected to the holder, being adapted to extend from a surface of the holder.

29. The interface element of claim 28 wherein the interface element is made of a material chemically resistant to substances adapted to be moved in the microfluidic structure.

30. The interface element of claim 29 wherein the interface element is made of a material chemically resistant to cleaning agents for the interface element.

31. A device for operating a microchip with a microfluidic structure, the microchip including supply elements for supplying substances to the microfluidic structure and structures for receiving potentials, the structures for receiving potentials being such as to cause movement of the substances in the microfluidic structure, the device comprising:

a supply unit for supplying the potentials for moving the substances in the microfluidic structure, the supply unit having first supply lines for the potentials to be coupled to the potential receiving structures, an interface element, a holder for selectively holding the interface element, the holder having a structure for cooperating with the interface element and for enabling the interface element to be physically connected to and physically disconnected from the holder, the holder having second supply lines for the potentials to be coupled to the potential receiving structures of the microchip, the second supply lines being adapted to be connected to the first supply lines, the interface element having coupling structures for supplying the potentials from the second supply lines to the potential receiving structures of the microchip corresponding with the coupling structures in response to the first and second supply lines being connected and the potentials being supplied to the first supply lines, the interface element and the holder structure for enabling the interface element to be physically connected to and physically disconnected from the holder being arranged so that the coupling structures of the interface element between the second supply lines and the corresponding potential receiving structures of the microchip are (a) physically connected together in response to the physical connection occurring between the holder and the interface element, and (b) physically disconnected from each other in response to the physical disconnection occurring between the holder and the interface element, the interface element having a first surface that faces a surface of the microchip while (a) the physical connection occurs between the holder and the interface element and (b) the interface element supplies the potentials to the potential receiving structures of the microchip, the interface element having a second surface facing a segment of the holder while the interface element is physically connected to the holder, the supply unit and the holder having structures for enabling the holder to be physically connected to the supply unit and physically disconnected from the supply unit so that, when the supply unit and the holder are physically connected, the first and second supply lines are connected, and when the supply unit and the holder are physically disconnected there are no connections between the first and second supply lines.

32. The device of claim 31 wherein the potential is electric, the interface element includes a dielectric substrate and the coupling structures of the interface element include contact electrodes including spring pins. 47.

33. The device of claim 31 wherein the interface element is made of a material chemically resistant to substances adapted to be moved in the microfluidic structure.

34. The device of claim 31 wherein the interface element is made of a material chemically resistant to cleaning agents for the interface element.

35. A method of operating a device including a microchip with a microfluidic structure, the microchip including supply elements for supplying substances to the microfluidic structure and structures for receiving potentials, the structures for receiving potentials being such as to cause movement of the substances in the microfluidic structure, the device further including: a supply unit for supplying the potentials for moving the substances in the microfluidic structure, the supply unit having first supply lines for the potentials to be coupled to the potential receiving structures, an interface element, a holder for selectively holding the interface element, the holder having second supply lines for the potentials to be coupled to the potential receiving structures of the microchip, the interface element having coupling structures for supplying the potentials from the second supply lines to the potential receiving structures of the microchip corresponding with the coupling structures in response to the first and second supply lines being connected and the potentials being supplied to the first supply lines, the method comprising:
supplying the potentials to the potential receiving structures of the microchip as result of the first and second supply lines being connected to each other, and by (a) physically connecting the coupling structures of the interface element to the holder, and (b) physically connecting the coupling structures of the interface element to the potential receiving structures of the microchip so that the potentials supplied by the supply unit are coupled to the potential receiving structures of the microchip by way of the first and second supply lines and the coupling structures of the interface element,
the physical connection of the coupling structures of the interface element to the holder being provided by placing a first surface of the interface element in close proximity to a facing surface of the holder in such a manner that the interface element extends from the facing surface,
the physical connection of the coupling structures of the interface element to the potential receiving structures of the microchip being provided by placing a second surface of the interface element in close proximity to a facing surface of the microchip,
breaking the physical connection of the coupling structures of the interface element to the potential receiving structures of the microchip, and
breaking the physical connection of the coupling structures of the interface element to the holder.

36. The method of claim 35 wherein the first and second surfaces of the interface element are substantially parallel to each other.

37. The method of claim 36 further comprising physically connecting the first and second supply lines to each other by physically connecting the supply unit to the holder, and physically disconnecting the first and second supply lines from each other by physically disconnecting the holder from the supply unit.

38. The method of claim 35 further comprising physically connecting the first and second supply lines to each other by physically connecting the supply unit to the holder, and physically disconnecting the first and second supply lines from each other by physically disconnecting the holder from the supply unit.

39. The device of claim 1 wherein the segment of the holder is included in a portion of the holder that covers the microchip and the interface element while the interface element is physically connected to the holder and the microchip, the second surface of the interface element and the segment of the holder having about the same surface areas, said portion of the holder having a surface area much greater than the surface areas of (a) the first and second surfaces of the interface element, (b) the segment of the holder and (c) the surface area of the microchip.

40. The device of claim 39 wherein the supply unit and the holder have structures for enabling the holder to be physically connected to the supply unit and physically disconnected from the supply unit so that when the supply unit and the holder are physically connected the first and second supply lines are connected, and when the supply unit and the holder are physically disconnected there are no connections between the first and second supply lines.

* * * * *